United States Patent
Han et al.

(10) Patent No.: US 8,140,333 B2
(45) Date of Patent: Mar. 20, 2012

(54) PROBABILITY DENSITY FUNCTION COMPENSATION METHOD FOR HIDDEN MARKOV MODEL AND SPEECH RECOGNITION METHOD AND APPARATUS USING THE SAME

(75) Inventors: Icksang Han, Yongin-si (KR); Sangbae Jeong, Suwon-si (KR); Eugene Jon, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1245 days.

(21) Appl. No.: 11/066,428

(22) Filed: Feb. 28, 2005

(65) Prior Publication Data

US 2005/0192806 A1    Sep. 1, 2005

(30) Foreign Application Priority Data

Feb. 28, 2004   (KR) .................. 10-2004-0013815

(51) Int. Cl.
*G10L 15/00*      (2006.01)
*G10L 15/06*      (2006.01)
(52) U.S. Cl. ............... 704/256.7; 704/245; 704/256.3
(58) Field of Classification Search .......... 704/238, 704/246, 255, 256
See application file for complete search history.

(56) References Cited

U.S. PATENT DOCUMENTS

| | | | |
|---|---|---|---|
| 5,742,928 A * | 4/1998 | Suzuki | 704/239 |
| 5,995,927 A * | 11/1999 | Li | 704/246 |
| 6,163,769 A * | 12/2000 | Acero et al. | 704/260 |
| 6,226,612 B1 * | 5/2001 | Srenger et al. | 704/256.2 |
| 6,662,160 B1 * | 12/2003 | Chien et al. | 704/256 |
| 6,879,956 B1 * | 4/2005 | Honda et al. | 704/244 |
| 2004/0181408 A1 * | 9/2004 | Acero et al. | 704/255 |
| 2004/0186718 A1 * | 9/2004 | Nefian et al. | 704/256 |

OTHER PUBLICATIONS

Jeong et al, "Memory and Computation Reduction for Embedded ASR Systems" Oct. 2004, ISCA.*
Afify et al "A Unified Maximum Likelihood Approach to Acoustic Mismatch Compensation: Application to Noisy Lombard speech Recognition", 1997, IEEE, pp. 839-842.*
Huo et al, "Irrelevant variability normalization in learning HMM state tying from data based on phonetic decision", 1999, IEEE International Conference on Acoustics, Speech, and Signal Processing, 1999. ICASSP '99, vol. 2, pp. 1-4.*
Huo et al, "A study of on-line quasi-Bayes adaptation for CDHMM-based speech recognition," IEEE International Conference on Acoustics, Speech, and Signal Processing, 1996. ICASSP-96, vol. 2, No., pp. 1-4.*

(Continued)

*Primary Examiner* — Richemond Dorvil
*Assistant Examiner* — Olujimi Adesanya
(74) *Attorney, Agent, or Firm* — Staas & Halsey LLP

(57) ABSTRACT

A probability density function compensation method used for a continuous hidden Markov model and a speech recognition method and apparatus, the probability density function compensation method including extracting feature vectors from speech signals, and using the extracted feature vectors, training a model having a plurality of probability density functions to increase probabilities of recognizing the speech signals; obtaining a global variance by averaging variances of the plurality of the probability density functions after completing the training; obtaining a compensation factor using the global variance; and applying the global variance to each of the probability density functions and compensating each of the probability density functions for the global variance using the compensation factor.

10 Claims, 3 Drawing Sheets

OTHER PUBLICATIONS

Office Action issued in Korean Patent Application No. 2004-13815 on Jan. 31, 2006.

On-line HMM adaptation using fast covariance compensation for robust speech recognition described at pp. 34-360, No. 2, vol. 28, The Korea Information Science Society, Academy presentation paper collections, 2001.

Adaptation of hidden Markov model for telephone speech recognition and speaker adaptation described at pp. 129-135, No. 3, vol. 144, IDD Proc. Of Visual Image Signal Process, 1997.

Natural Number Recognition Using MCE Trained Inter-Word Context Dependent Acoustic Models described at pp. 457-460, Proc. Of ICASSP, 1998.

* cited by examiner

PROBABILITY DENSITY FUNCTION COMPENSATION METHOD FOR HIDDEN MARKOV MODEL AND SPEECH RECOGNITION METHOD AND APPARATUS USING THE SAME

CROSS-REFERENCE TO RELATED APPLICATION

This application claims the benefit of Korean Patent Application No. 2004-13815, filed on Feb. 28, 2004 in the Korean Intellectual Property Office, the disclosure of which is incorporated herein by reference.

BACKGROUND OF THE INVENTION

1. Field of the Invention

The present invention relates to a probability density function compensation method and a speech recognition method and apparatus, and particularly, to a probability density function compensation method used for a continuous hidden Markov model and a speech recognition method and apparatus using the same.

2. Description of the Related Art

Generally, speech recognition starts by processing extracted feature vectors required for recognition and voice waveforms from an input voice. Secondly, recognizing or decoding is performed by using the so-called hidden Markov Model (HMM), which is a phoneme-level statistical model. A word-level acoustic model is formed by concatenating phone (such as a vowel or consonant)-level models in accordance with a pronunciation lexicon.

The HMM has been widely adopted for speech recognition because of its great modeling flexibility and high performance. In speech recognition, the HMM hides temporal states of a vocal organ and phonemes generated by the vocal organ and sets observed speech to an output to estimate the vocal organ state and phonemes.

The HMM is a double process represented by a state transition probability and an output probability. The state transition probability can be obtained by a Markov process. The output probability can be represented in three types. In the first type, the output probability is represented with codewords in VQ-based codebook which is obtained by a vector quantization (VQ), which means that all of the available acoustic features are represented with a discrete probability density function in the VQ-based codebook. In the second type, all of the available acoustic features can be represented with a continuous probability density function. The continuous probability density function greatly depends on acoustic units, because a spectral mean and standard deviation of several voice feature vectors are obtained with a voice. In the third type, the first and second types are combined.

In a discrete HMM (DHMM), an observation symbol, that is, a voice feature vector, is represented as the most approximate codeword through vector quantization. Therefore, there exists a possibility of several quantization errors. A continuous HMM (CHMM) is proposed in order to remove the quantization errors. However, the CHMM has not been widely used for speech recognition due to the following reasons. Firstly, there are a large number of model parameters to be estimated. In order to estimate the large number of model parameters, a large database and large amounts of calculations are needed. Secondly, the CHMM is sensitive to initial values. Therefore, an automatic speech recognition system is not suitable for a mobile phone having a small capacity of resources. Accordingly, it is necessary to reduce memory size and amounts of calculations for automatic speech recognition.

SUMMARY OF THE INVENTION

According to an aspect of the present invention, there is provided a probability density function compensation method by fixing standard deviation of a probability density function, requiring a large memory size for a predetermined value and compensating the probability density function for its recognition rate reduction associated with the fixed standard deviation. According to another aspect of the present invention, a speech recognition method and apparatus using the probability density function compensation method are provided.

According to an aspect of the present invention, there is provided a probability density function compensation method including extracting feature vectors from speech signals, and using the extracted feature vectors, training a model having a plurality of probability density functions to increase probabilities of recognizing the speech signals; obtaining a global standard deviation by averaging standard deviations of the plurality of the probability density functions after completing the training; obtaining a compensation factor using the global standard deviation; and applying the global standard deviation to each of the probability density functions and compensating each of the probability density functions for the global standard deviation by using the compensation factor.

According to another aspect of the present invention, there is provided a speech recognition method including: extracting first feature vectors from speech signals, and using the extracted first feature vectors, training a model having a plurality of probability density functions to increase probabilities of recognizing the speech signals; obtaining a global standard deviation by averaging standard deviation of the plurality of the probability density functions after completing the training; obtaining a compensation factor using the global standard deviation; applying the global standard deviation to the probability density functions and correcting the model by compensating each of the probability density functions for the global standard deviation by using the compensation factor; extracting second feature vectors from speech signals to be recognized; and recognizing the speech signals by applying the second feature vectors to the corrected model.

According to another aspect of the present invention, there is provided a speech recognition apparatus including a feature extracting portion extracting feature vectors from speech signals; a model portion having a plurality of probability density functions training the model portion using the extracted feature vectors to increase probabilities of outputting a target recognition value corresponding to each of the probability density functions, and after completing the training, compensating each of the probability density functions with a predetermined compensation factor; a global standard deviation extracting portion obtaining a global standard deviation by averaging standard deviations of the probability density functions after the training is completed; and a compensation factor extracting portion extracting the compensation factor using the global standard deviation to compensate the probability density functions, and providing the compensation factor to the model portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
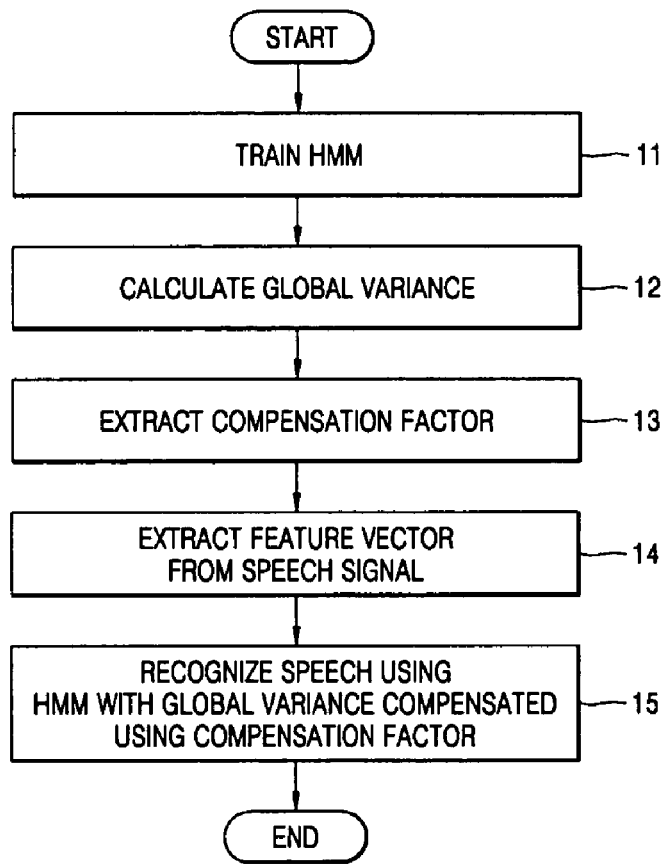
FIG. 1 is a flowchart showing a speech recognition method according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
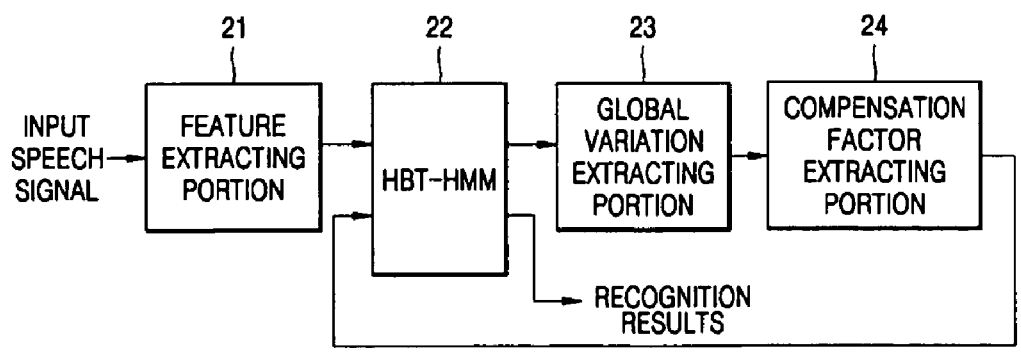
FIG. 2 is a block diagram showing a speech recognition apparatus according to an embodiment of the present invention.

FIG. 1 is a flowchart showing a speech recognition method according to an embodiment of the present invention. FIG. 2 is a block diagram showing a speech recognition apparatus according to an embodiment of the present invention.

In an aspect of the present invention, an object of speech recognition is to obtain a continuous numeric speech. The speech recognition is performed, as follows. Firstly, a proper structure of a hidden Markov model (HMM) is selected for recognizing the numeric speech, and the selected HMM is trained using training data (S11). The selected HMM of the present invention is a head-body-tail (HBT) HMM 22 as shown in FIG. 2. The HBT HMM is dependent on contexts. More specifically, the HBT HMM includes concatenated head, body, and tail units. The head unit is a left-context dependent unit, and the tail unit is a right-context dependent unit. The body unit is a context independent unit. Next, a number of states of each of the head, body, and tail units is determined and a number of mixture Gaussian probability density functions (PDF) for each of the states is determined.

After the structure of the HBT HMM 22 is selected, the HBT HMM 22 is trained using the training data. The training data includes the consecutive numbers and feature vectors extracted from numeric speech signals and corresponding digits. The feature vectors are obtained by a feature extracting portion 21, which detects start and end points of the numeric speech signals and extracts the feature vectors from corresponding numeric speech signals between the detected start and points. The extracted feature vectors are input to the HBT HMM 22. The HBT HMM 22 outputs probability for each state in accordance with the mixture Gaussian PDFs. Parameters of the HBT HMM 22 are trained to be updated so that output probabilities of states of a unit corresponding to a feature vector of a certain numeric speech become maximized. The parameters of the HBT HMM 22 include averages and standard deviations of the mixture Gaussian PDFs.

A feature vector adopted in an embodiment of the present invention is a Mel-frequency cepstral coefficient (MFCC) vector. The MFCC models a human ear. The MFCC is obtained by taking a logarithm on outputs of a Mel filter bank and performing an inverse discrete Fourier transformation on the logarithm. An embodiment of the present invention adopts a 39-dimensional MFCC feature vector. The feature values of the 39-dimensional MFCC feature vector include 6 streams of 12 cepstral coefficients, an energy, a delta coefficient, a delta energy, a delta-delta coefficient, and a delta-delta energy. Here, the delta coefficient is a cepstral coefficient difference between frames; the delta energy is an energy difference between the frames; the delta-delta coefficient is a delta coefficient difference between the frames; and the delta-delta energy is a delta energy difference between the frames.

After the training is completed, a global standard deviation extracting portion 23 calculates a global standard deviation $\sigma_{gi}$ of the HBT HMM 22 (S12). The global standard deviation $\sigma_{gi}$ is obtained by averaging standard deviations $\sigma i$ for states of the HBT HMM 22. In an adopted HBT HMM 22 for recognition, all the standard deviations are equally set as the global standard deviation $\sigma_{gi}$.

The speech recognition using the global standard deviation $\sigma_{gi}$ requires reduced memory size, but results in lowered recognition rate. In order to compensate for the lowered recognition rate, the average of the mixture Gaussian PDFs is quantized and the compensation factor is used to compensate for the global standard deviation $\sigma_{gi}$.

A compensation factor extracting portion 24 extracts the compensation factor from the global standard deviation $\sigma_{gi}$, as follows.

The mixture Gaussian PDFs $N(\vec{x}, \vec{m}, \sigma)$ corresponding to the states are represented by Equation 1.

$$N(\vec{x}, \vec{m}, \sigma) = \frac{1}{\sigma_1 \sigma_2 \cdots \sigma_D \sqrt{(2\pi)^D}} e^{-\frac{1}{2}\sum_{i=1}^{D}(\frac{x_i - m_i}{\sigma_i})^2} \quad \text{[Equation 1]}$$

Here, D indicates a dimension of the MFCC, $x_i$ is an i-th dimensional value of the feature vector, $m_i$ is an average of mixture Gaussian PDFs corresponding to the i-th dimensional feature vector, and $\sigma_i$ is a standard deviation of the mixture Gaussian PDFs corresponding to the i-th dimensional feature vector.

A negative log likelihood of the mixture Gaussian PDFs according to Equation 1 is represented by Equation 2.

$$G + \frac{1}{2}\sum_{i=1}^{D} \frac{(x_i - m_i)^2}{\sigma_i^2} \quad \text{[Equation 2]}$$

Here, G is an arbitrary constant.

Equation 2 can be represented with the global standard deviation $\sigma_{gi}$ by Equation 3.

$$G' + \frac{1}{2}\sum_{i=1}^{D} \frac{(x_i - m_i)^2}{\sigma_{gi}^2} \quad \text{[Equation 3]}$$

The G' is a change of the constant G when the standard deviation $\sigma_i$ is replaced with the global standard deviation $\sigma_{gi}$.

The compensation factor $\alpha_A^*$ corresponding to a stream A of the feature vectors can be obtained from Equation 3, as follows. Here, A gets differed for each stream. In an embodiment of the present invention, A gets differed for streams of the 1-st to 12-th dimensional feature vectors, a stream of the 13-th dimensional feature vector, streams of the 14-th to 25-th dimensional feature vectors, a stream of the 26-th dimensional feature vector, streams of the 27-th to 28-th dimensional feature vectors, and a stream of the 39-th dimensional feature vector.

Firstly, a ratio $\beta_i$ of a square of standard deviation of each mixture Gaussian PDF to a global standard deviation is obtained.

$$\beta_i = \frac{\sigma_i^2}{\sigma_{gi}^2} \quad \text{[Equation 4]}$$

The optimal compensation factor $\alpha_A^*$ can be obtained from Equation 4 by using a minimum means square error method, as follows. As a result, the optimal compensation factor $\alpha_A^*$ is an average of the standard deviation ratios $\beta_i$ of the streams.

$$\alpha_A^* = \arg\min_{\alpha_A} \sum_{i=A\_start\_id}^{A\_end\_id} (\beta_i - \alpha_A)^2 = E\{\beta_i\}, \quad \text{[Equation 5]}$$

for $A\_start\_id \leq i \leq A\_end\_id$

Here, A_start_id and A_end_id denote starting and ending dimensions of each stream. $E\{\beta_i\}$ denotes average of $\beta_i$. $\alpha_A$ denotes an arbitrary constant, for example, a minimum value of $\beta_i$ in a stream.

A negative log likelihood compensated with the optimal compensation factor $\alpha_A^*$ in Equation 5 can be obtained by Equation 6.

$$G' + \frac{1}{2\alpha_A^*} \sum_{i=1}^{D} \frac{(x_i - m_i)^2}{\sigma_{gi}^2} \quad \text{[Equation 6]}$$

The optimal compensation factors $\alpha_A^*$ in Equation 6 exist in the respective streams.

The global standard deviation compensated in accordance with Equation 6 is applied to the HBT HMM 22 used for the speech recognition process.

The speech recognition process using the HBT HMM 22 subjected to the training and compensation process is as follows. Firstly, a feature extracting portion 21 extracts feature vectors from an input speech signal (S14). Using the extracted feature vectors, the HBT HMM 22 outputs a number corresponding to a maximum of output probabilities as a recognized number (S15).

Figure 3A:
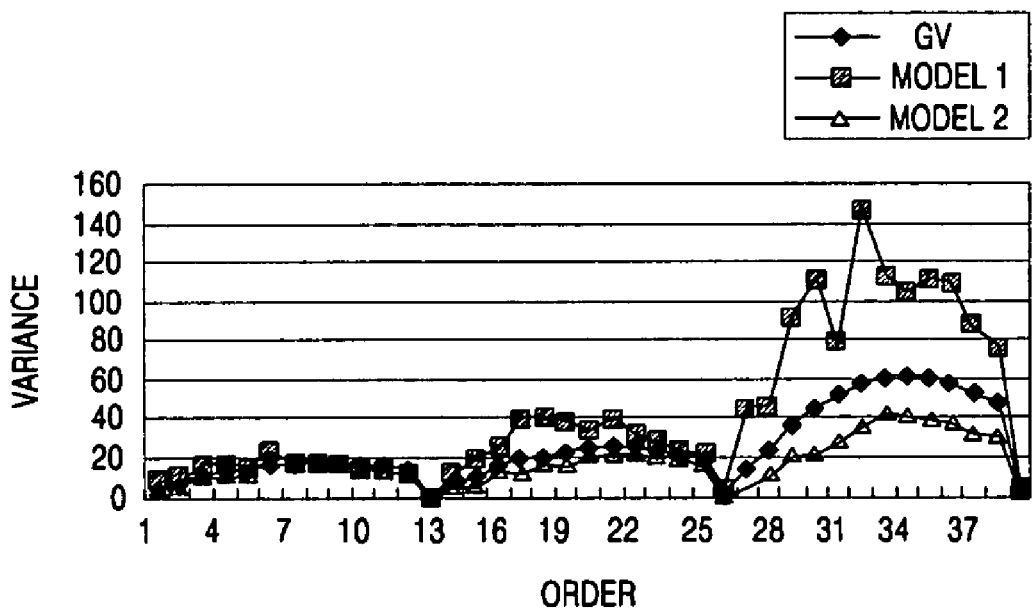
FIGS. 3A to 3C illustrate standard deviations over orders of Mel-frequency cepstral coefficients (MFCC).
Figure 3B:
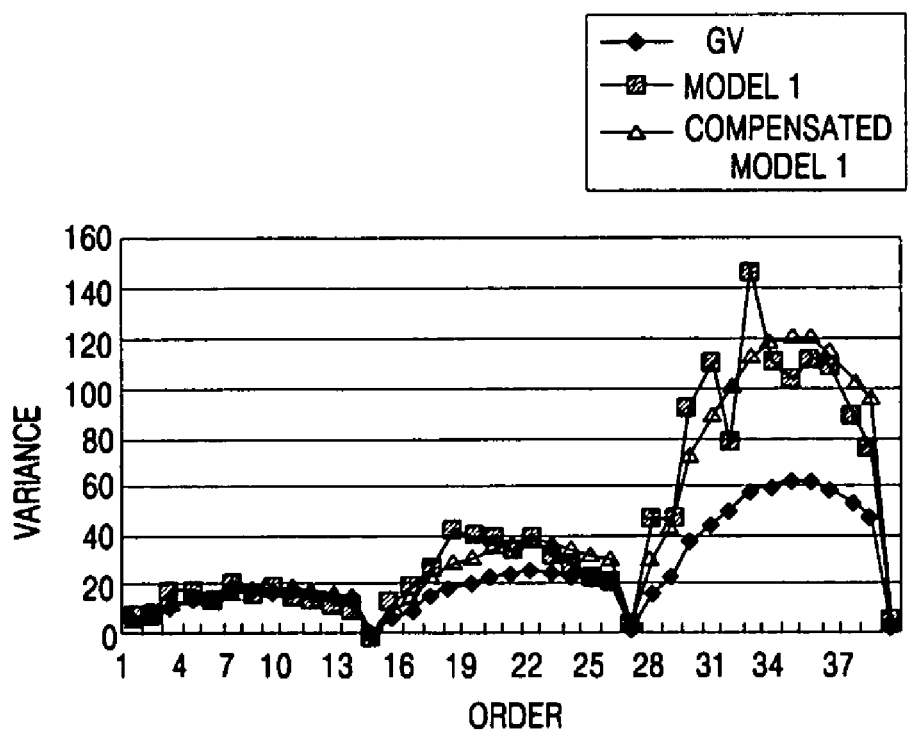
Figure 3C:
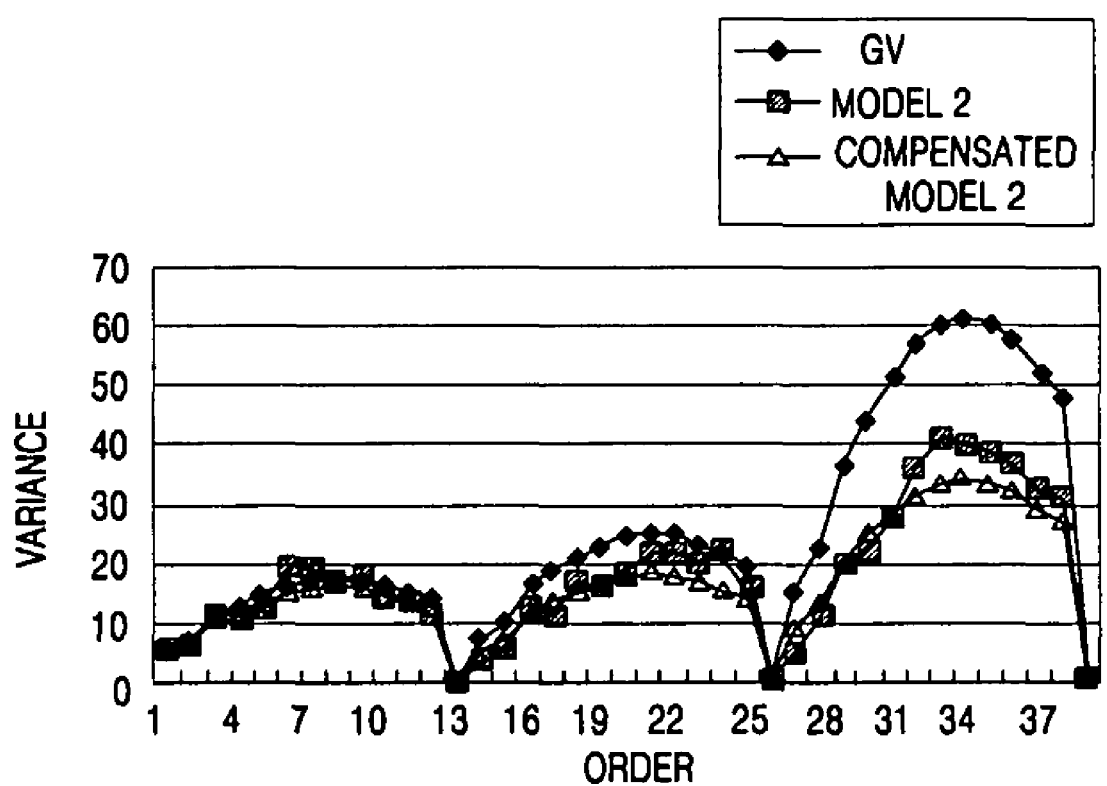

FIGS. 3A to 3C illustrate standard deviations over orders of Mel-frequency cepstral coefficients (MFCC). The 1st to 12-th dimensional coefficients correspond to cepstral coefficients. The 13-th dimensional coefficient corresponds to energy. The 14-th to 25-th dimensional coefficients correspond to delta coefficients. The 26-th dimensional coefficient corresponds to delta energy. The 27-th to 38-th dimensional coefficients correspond to delta-delta coefficients. The 39-th dimensional coefficient corresponds to delta-delta energy. In the figures, "GV" denotes a global standard deviation. The "Model 1" and "Model 2" denote original standard deviations.

FIG. 3B shows results of compensating the standard deviation of Model 1 in FIG. 3A. FIG. 3C shows results of compensating the standard deviation of Model 2 in FIG. 3A.

Referring to FIGS. 3A to 3C, it can be seen that each standard deviation is compensated.

Table 1 shows recognition results for four Korean continuous numeric speeches in accordance with an embodiment of the present invention and a conventional art. In the embodiment of the present invention, the 39-dimensional MFCC feature vectors are input, and 50,000 continuous numeric speech sets uttered by 100 persons are used as training data, and 2,000 continuous numeric speech sets uttered by 10 persons are used as test data. The conventional art includes speech recognition using an original standard deviation and a VQ-based standard deviation.

In the experiment, the speech recognition is performed on eleven Korean numeric speeches, silence, and pause. The 11 Korean numeric speeches are "young" (0), "gong" (0), "il" (1), "ee" (2), "sam" (3), "sa" (4), "oh" (5), "youk" (6), "chil" (7), "pahl" (8), and "gu" (9).

The HMM used in the embodiment of the present invention includes partial models having 7 head units, 1 body unit, and 7 tail units, totaling 167 units, for each number. In a case where sex of the persons is considered, 332 units are used. In addition, the head, body, and tail units have 3, 2, and 3 states, respectively. Each of the states has 8 mixture Gaussian PDFs and weighted-sums outputs of the 8 mixture Gaussian PDFs to determine output probability.

TABLE 1

| Algorithm | Recognition rate (%) | Memory Size (M) |
| --- | --- | --- |
| Original Standard | 86.8 | 2.34 |
| Global Standard Deviation | 84.1 | 1.19 |
| Vector-quantized Standard Deviation | 84.8 | 1.20 |
| The Present Invention | 86.0 | 1.26 |

Referring to Table 1, it can be observed that the memory size needed for the present invention is lower than the memory size needed for a conventional art by 46.2% although the recognition rate according to the present invention is lower than the recognition rate of the original standard deviation by about 0.8%. In addition, it can be observed that the recognition rate according to the present invention is larger than the recognition rate of the conventional art adopting a global standard deviation and a vector quantized standard deviation although the memory size in the present invention is somewhat larger than in the conventional art.

According to the present invention, a memory size can be reduced by using a global standard deviation of a continuous HMM and a recognition rate can be improved by compensating for the global standard deviation, when the continuous HMM is applied to speech recognition.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A probability density function compensation method, executed by a computer, the method comprising:
    extracting feature vectors from speech signals, and using the extracted feature vectors,
    training a model having a plurality of probability density functions to increase probabilities of recognizing the speech signals;
    obtaining a global standard deviation by averaging standard deviations of the probability density functions to fix standard deviation of each of the probability density functions after completing the training;
    obtaining a compensation factor using the global standard deviation to compensate the probability density functions; and applying using the computer, the global standard deviation to each of the probability density functions and compensating each of the probability density functions for the global standard deviation by using the compensation factor.

2. The probability density function compensation method according to claim 1, wherein the compensating of each of the probability density functions comprises:
   obtaining ratios of squares of the standard deviations with respect to a square of the global standard deviation;
   averaging the obtained ratios for each of streams of the feature vectors to obtain an average ratio; and
   multiplying the average ratio by the global standard deviation for each of the streams.

3. A speech recognition method, executed by a computer, the method comprising:
   extracting first feature vectors from speech signals, and using the extracted first feature vectors, training a model having a plurality of probability density functions to increase probabilities of recognizing the speech signals;
   obtaining a global standard deviation by averaging standard deviations of the plurality of the probability density functions after completing the training;
   obtaining a compensation factor using the global standard deviation;
   applying using the computer, the global standard deviation to the plurality of probability density functions and correcting the model by compensating each of the probability density functions for the global standard deviation by using the compensation factor;
   extracting second feature vectors from the speech signals to be recognized; and
   recognizing the speech signals by applying the second feature vectors to the corrected model.

4. The speech recognition method according to claim 3, wherein the correcting of the model comprises:
   obtaining ratios of squares of the standard deviation with respect to a square of the global standard deviation;
   averaging the obtained ratios for each of streams of the feature vectors to obtain an average ratio; and
   multiplying the average ratio by the global standard deviation for each of the streams.

5. The speech recognition method according to claim 3, wherein the model is a head-body-tail hidden Markov model.

6. A speech recognition apparatus comprising:
   a feature extracting portion to extract feature vectors from speech signals;
   a model portion having a plurality of probability density functions to train the model portion using the extracted feature vectors to increase probabilities of outputting a target recognition value corresponding to each of the probability density functions, and after completing the training, compensates each of the probability density functions with a predetermined compensation factor;
   a global standard deviation extracting portion to obtain a global standard deviation by averaging standard deviation of the probability density functions after completing the training; and
   a compensation factor extracting portion to extract the compensation factor using the global standard deviation to compensate the probability density functions, and to provide the compensation factor to the model portion.

7. The speech recognition apparatus according to claim 6, wherein the model portion utilizes a head-body-tail hidden Markov model.

8. A method, executed by a computer, comprising:
   training a model having a plurality of probability density functions to increase probabilities of recognizing the speech signals; and
   obtaining a global standard deviation by averaging standard deviations of the plurality of the probability density functions after completing the training.

9. The speech recognition apparatus according to claim 6, wherein the feature vectors are 39-dimensional Mel-frequency cepstral coefficient (MFCC) feature vectors obtaining a compensation factor using the global standard deviation to compensate the probability density functions; and
   applying, using the computer, the global standard deviation to each of the probability density functions and compensating each of the probability density functions for the global standard deviation by using the compensation factor.

10. The probability density function compensation method according to claim 1, wherein the feature vectors are 39-dimensional Mel-frequency cepstral coefficient (MFCC) feature vectors, and
   wherein the compensating of each of the probability density functions further comprises:
   obtaining ratios of squares of the standard deviations with respect to a square of the global standard deviation;
   averaging the obtained ratios for each of: streams corresponding to the first to twelfth dimensional feature vectors, a stream corresponding to the thirteenth dimensional feature vector, streams corresponding to the fourteenth to twenty-fifth dimensional feature vectors, a stream corresponding to the twenty-sixth dimensional vector, streams corresponding to the twenty-seventh to thirty-eighth dimensional feature vectors, and a stream corresponding to the thirty-ninth dimensional feature vector, to obtain an average ratio; and
   multiplying the average ratio corresponding to each of the streams corresponding to the first to twelfth dimensional feature vectors, a stream corresponding to the thirteenth dimensional feature vector, streams corresponding to the fourteenth to twenty-fifth dimensional feature vectors, a stream corresponding to the twenty-sixth dimensional vector, streams corresponding to the twenty-seventh to thirty-eighth dimensional feature vectors, and a stream corresponding to the thirty-ninth dimensional feature vector, by the global standard deviation.

* * * * *

UNITED STATES PATENT AND TRADEMARK OFFICE
CERTIFICATE OF CORRECTION

PATENT NO. : 8,140,333 B2
APPLICATION NO. : 11/066428
DATED : March 20, 2012
INVENTOR(S) : Icksang Han et al.

It is certified that error appears in the above-identified patent and that said Letters Patent is hereby corrected as shown below:

In the Claims

In Col. 8, Line 12, In Claim 8, delete Claim 8 in its entirety and insert -- 8. A method, executed by a computer, comprising:
  training a model having a plurality of probability density functions to increase probabilities of recognizing the speech signals;
  obtaining a global standard deviation by averaging standard deviations of the plurality of the probability density functions after completing the training;
  obtaining a compensation factor using the global standard deviation to compensate the probability density functions; and
  applying using the computer, the global standard deviation to each of the probability density functions and compensating each of the probability density functions for the global standard deviation by using the compensation factor. --, therefor.

In Col. 8, Line 18, In Claim 9, delete Claim 9 in its entirety and insert -- 9. The speech recognition apparatus according to claim 6, wherein the feature vectors are 39-dimensional Mel-frequency cepstral coefficient (MFCC) feature vectors. --, therefor.

Signed and Sealed this
Thirty-first Day of December, 2013

Margaret A. Focarino
*Commissioner for Patents of the United States Patent and Trademark Office*